(12) United States Patent
Chen et al.

(10) Patent No.: US 9,124,345 B2
(45) Date of Patent: Sep. 1, 2015

(54) IF PROCESS ENGINE AND RECEIVER HAVING THE SAME AND METHOD FOR REMOVING IF CARRIERS USED THEREIN

(75) Inventors: Chun-nan Chen, Taipei (TW); Ping-hsuan Tsu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 1874 days.

(21) Appl. No.: 12/326,476

(22) Filed: Dec. 2, 2008

(65) Prior Publication Data

US 2009/0081978 A1   Mar. 26, 2009

Related U.S. Application Data

(63) Continuation-in-part of application No. 11/469,697, filed on Sep. 1, 2006.

(51) Int. Cl.
*H04B 1/26* (2006.01)
*H04B 1/30* (2006.01)
*H04B 1/00* (2006.01)

(52) U.S. Cl.
CPC ............... *H04B 1/30* (2013.01); *H04B 1/0007* (2013.01); *H04B 1/005* (2013.01); *H04B 1/006* (2013.01); *H04B 1/0067* (2013.01)

(58) Field of Classification Search
CPC ...... H04B 1/0007; H04B 1/005; H04B 1/006; H04B 1/406; H04B 1/26
USPC .............. 455/132, 141, 323, 318, 523.1, 231, 455/334; 342/352, 357.2–357.78; 375/136, 375/147
See application file for complete search history.

(56) References Cited

U.S. PATENT DOCUMENTS

| 4,485,383 | A | * | 11/1984 | Maher | 342/352 |
| 5,430,890 | A | | 7/1995 | Vogt et al. | |
| 5,621,416 | A | * | 4/1997 | Lennen | 342/357.68 |
| 5,710,789 | A | * | 1/1998 | Snodgrass et al. | 375/134 |
| 5,995,814 | A | * | 11/1999 | Yeh | 455/180.1 |

(Continued)

FOREIGN PATENT DOCUMENTS

| CN | 1283056 | 2/2001 |
| CN | 1625064 | 6/2005 |

(Continued)

OTHER PUBLICATIONS

Mark L, Psiaki, Steven P. Powell, Hee Jung, and Paul M. Kintner; "Design and Practical Implementation of Multifrequency RF Front Ends Using Direct RF Sampling", IEEE Transactions on Microwave Theory and Techniques, vol. 53, No. 10, Oct. 2005.

*Primary Examiner* — Duc M Nguyen
(74) *Attorney, Agent, or Firm* — Kirton McConkie; Evan R. Witt

(57) ABSTRACT

A GNSS receiver having an IF process engine is disclosed. The IF process engine provides a plurality of carriers with different frequencies and down converts IF signals into baseband signals by using the carriers in a time division multiplex (TDM) schedule. The IF process engine has a local oscillator part for generating the carriers with different frequencies; an IF down-converter for respectively mixing the IF signal with the carriers generated by the local oscillator part to generate IF removed signal segments; a time division multiplex (TDM) controller for scheduling the respective mixing operations of the IF down-converter for the IF signal with the respective carriers; and a buffer for storing the IF removed signal segments generated by the IF down-converter.

23 Claims, 7 Drawing Sheets

(56) References Cited

U.S. PATENT DOCUMENTS

| | | | |
|---|---|---|---|
| 6,097,974 A * | 8/2000 | Camp et al. | 455/575.7 |
| 6,498,926 B1 | 12/2002 | Ciccarelli et al. | |
| 6,728,528 B1 * | 4/2004 | Loke | 455/318 |
| 6,744,832 B2 | 6/2004 | Miao | |
| 7,460,615 B2 * | 12/2008 | Kunysz et al. | 375/316 |
| 7,489,745 B2 | 2/2009 | Fudge | |
| 7,817,090 B2 | 10/2010 | Torimoto et al. | |
| 2002/0154687 A1 * | 10/2002 | Bierly et al. | 375/222 |
| 2002/0173337 A1 | 11/2002 | Hajimiri et al. | |
| 2002/0187762 A1 | 12/2002 | Whikehart et al. | |
| 2003/0151964 A1 * | 8/2003 | Takahashi et al. | 365/204 |
| 2005/0053165 A1 | 3/2005 | Lakkis | |
| 2005/0239398 A1 * | 10/2005 | Lai | 455/3.02 |
| 2006/0141969 A1 * | 6/2006 | Dubash et al. | 455/285 |
| 2007/0025478 A1 * | 2/2007 | Koga | 375/345 |
| 2008/0057884 A1 * | 3/2008 | Wei et al. | 455/130 |

FOREIGN PATENT DOCUMENTS

| | | |
|---|---|---|
| JP | 2007-17184 | 1/2007 |
| TW | I243543 | 11/2005 |
| TW | I244260 | 11/2005 |
| TW | I244269 | 11/2005 |
| TW | I246250 | 12/2005 |
| TW | I246251 | 12/2005 |
| TW | 200814651 | 3/2008 |

* cited by examiner

| Arm | Sequence |
|---|---|
| I | -1+1+2+2+1-1-2-2 |
| Q | +2+2+1-1-2-2-1+1 |

IF PROCESS ENGINE AND RECEIVER HAVING THE SAME AND METHOD FOR REMOVING IF CARRIERS USED THEREIN

CROSS-REFERENCE TO RELATED APPLICATIONS

The present application is a continuation-in-part of U.S. patent application Ser. No. 11/469,697, entitled "Programmable direct RF digitization receiver for multiple RF bands", filed on Sep. 1, 2006.

TECHNICAL FIELD OF THE INVENTION

The present invention relates to a GNSS receiver, more particularly, to a receiver using a shared IF (intermediate frequency) processing engine for a plurality of spread spectrum signals with different carrier frequencies.

BACKGROUND OF THE INVENTION

Nowadays, more than one Global Navigation Satellite System (GNSS) is available, which includes GPS (Global Positioning System), Galileo and GLONASS (GLObal NAvigation Satellite System). GPS uses CDMA (Code Division Multiple Access). That is, in GPS, satellites are distinguished from each other by modulating signals of the respective satellites with different PRN codes. GLONASS uses FDMA (Frequency Division Multiple Access). That is, in GLONASS, satellites are distinguished from each other by using different carrier frequencies. Table 1 shows GLONASS carrier frequencies in L1 and L2 sub-bands.

TABLE 1

GLONASS carrier frequencies in L1 and L2 sub-bands

| No. of channel | Nominal value of frequency in L1 sub-band, MHz | No. of channel | Nominal value of frequency in L2 sub-band, MHz |
|---|---|---|---|
| 13 | 1609.3125 | 13 | 1251.6875 |
| 12 | 1608.75 | 12 | 1251.25 |
| 11 | 1608.1875 | 11 | 1250.8125 |
| 10 | 1607.625 | 10 | 1250.375 |
| 09 | 1607.0625 | 09 | 1249.9375 |
| 08 | 1606.5 | 08 | 1249.5 |
| 07 | 1605.9375 | 07 | 1249.0625 |
| 06 | 1605.375 | 06 | 1248.625 |
| 05 | 1604.8125 | 05 | 1248.1875 |
| 04 | 1604.25 | 04 | 1247.75 |
| 03 | 1603.6875 | 03 | 1247.3125 |
| 02 | 1603.125 | 02 | 1246.875 |
| 01 | 1602.5625 | 01 | 1246.4375 |
| 00 | 1602.0 | 00 | 1246.0 |
| −01 | 1601.4375 | −01 | 1245.5625 |
| −02 | 1600.8750 | −02 | 1245.1250 |
| −03 | 1600.3125 | −03 | 1244.6875 |
| −04 | 1599.7500 | −04 | 1244.2500 |
| −05 | 1599.1875 | −05 | 1243.8125 |
| −06 | 1598.6250 | −06 | 1243.3750 |
| −07 | 1598.0625 | −07 | 1242.9375 |

FIG. 1 is a block diagram schematically and generally shows a basic structure of a modern GNSS receiver 100 in accordance with related art. The receiver 100 includes an antenna 101, an RF front end 112, an IF down-converter 123, a local oscillator 128, a correlator engine 130, a correlator memory 135, a local code generator 147 and a processor 150. The receiver 100 receives a satellite signal in RF band via the antenna 101. The received RF signal is down converted into an IF signal in the RF front end 112, which also amplifies the signal. The IF signal is passed to the IF down-converter 123. The IF down-converter 123 down converts the IF signal into a baseband signals by using an IF carrier provided by the local oscillator 128. The baseband signal is passed to the correlator engine 130 to be correlated with a code provided by the local code generator 147. The correlation result is stored in a correlator memory 135 for accumulation. The processor 150 processes the correlation result and/or the accumulation of the correlation result to generate PVT (position-velocity-time) information. In this structure, the IF carrier frequency can only be a fixed value. However, in practice, spread spectrum signals from different satellites (e.g. GLONASS mentioned above) or different GNSS systems may use different carriers. That is, the carrier frequencies of the incoming spread spectrum signals are different. As a result, multiple IF carrier removal modules are used in a current receiver such as a GLONASS receiver to improve satellite searching and tracking efficiency. Each of the IF carrier removal modules is for a specific carrier frequency.

SUMMARY OF THE INVENTION

By using the receiver of the present invention, the spread spectrum signals with different carrier frequencies can share an identical IF (carrier) removal module, that is, an IF process engine proposed in the present invention. In accordance with the present invention, the GNSS receiver includes an antenna for receiving radio frequency (RF) signals; an RF front end for down converting the RF signals into intermediate frequency (IF) signals; an IF process engine for providing a plurality of carriers with different frequencies and down converting the IF signals into baseband signals by using the carriers in a time division multiplex (TDM) schedule; and a correlator engine for correlating the baseband signals with codes to generate correlation results. The IF process engine operates with a speed which is several times of that of the RF front end, depending on the TDM schedule set in the IF process engine.

The IF process engine has a local oscillator part for generating a plurality of carriers with different frequencies; an IF down-converter for respectively mixing an IF signal with the carriers generated by the local oscillator part to generate IF removed signal segments; a time division multiplex (TDM) controller for scheduling the respective mixing operations of the IF down-converter for the IF signal with the respective carriers; and a buffer for storing the IF removed signal segments generated by the IF down-converter.

BRIEF DESCRIPTION OF THE DRAWINGS

The present invention will be further described in details in conjunction with the accompanying drawings.

DETAILED DESCRIPTION OF THE INVENTION

Figure 1:
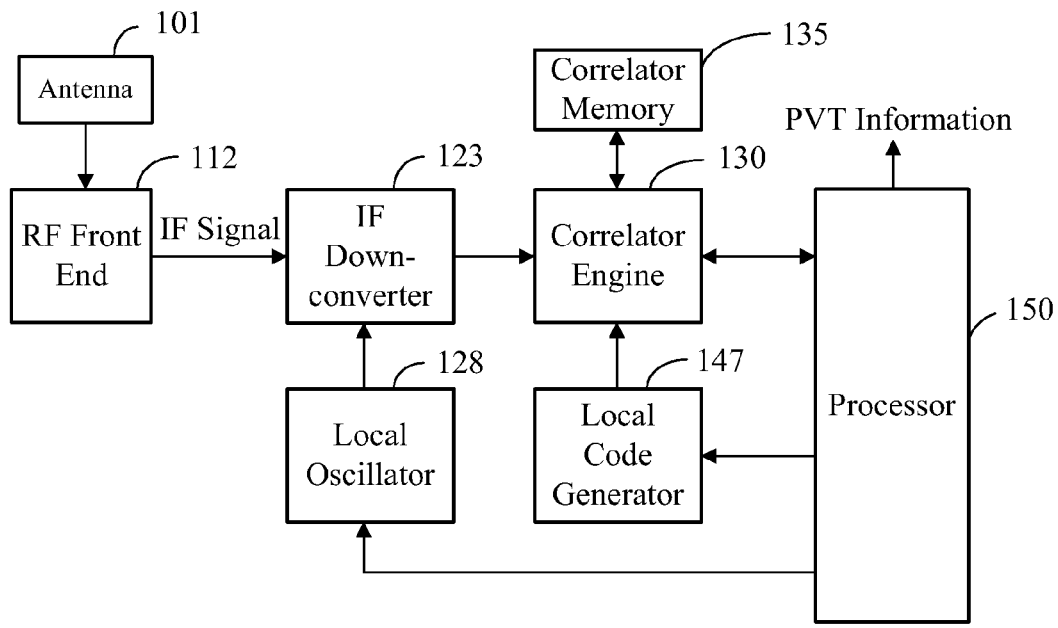
FIG. 1 is a schematic illustration showing a modern GNSS receiver.
Figure 2:
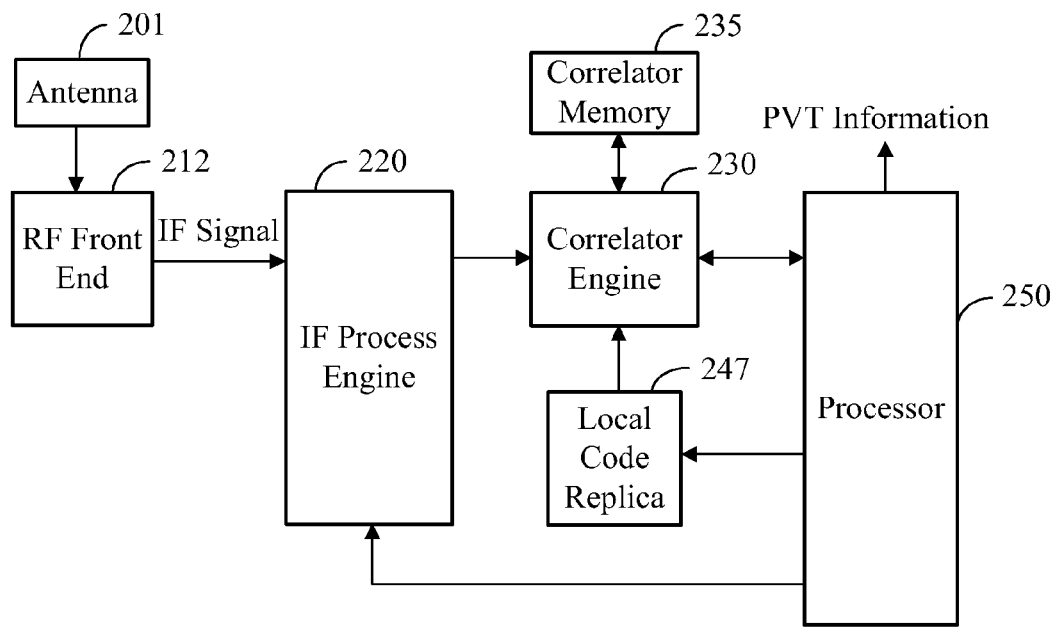
FIG. 2 is a schematic illustration showing a GNSS receiver in accordance with the present invention.

FIG. 2 is a schematic illustration showing a GNSS receiver 200 in accordance with the present invention. The basic structure of the receiver 200 is similar to that of the receiver 100 of FIG. 1, and the like reference numbers indicate the same components, and therefore the descriptions thereof are omitted herein. The main difference between the receiver 200 from the receiver 100 is that the receiver 200 has an IF process engine 220 for converting IF signals with different carrier frequencies from an RF front end 212 into baseband signals.

Figure 3:
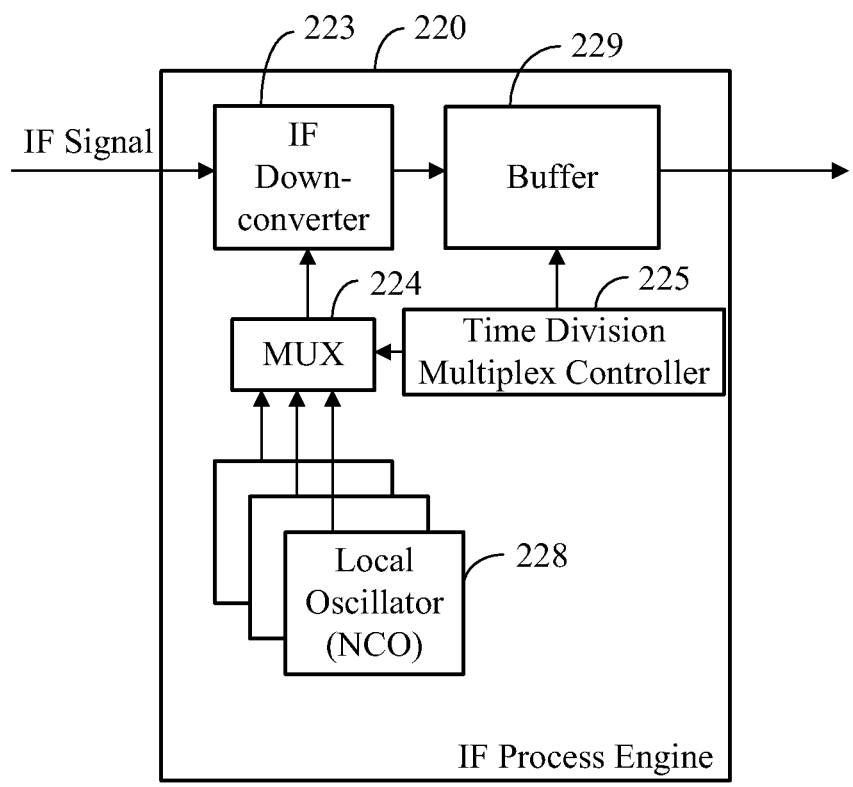
FIG. 3 is a block diagram schematically showing an IF process engine in accordance with a first embodiment of the present invention.

FIG. 3 is a block diagram schematically showing the IF process engine 220. In the present embodiment, the IF process engine 220 has an IF down-converter 223, a multiplexer (MUX) 224, a time division multiplex (TDM) controller 225, a plurality of local oscillators 228, each of which can be simply implemented by an NCO, and a buffer 229. As can be seen from the drawing, the local oscillator part of this IF process engine 220 includes three local oscillators 228, for example. The respective local oscillators 228 generate different carriers, that is, carriers with different frequencies. The carriers are scheduled to be sequentially passed to the IF down-converter 223 via the multiplexer 224 controlled by the time division multiplex controller 225. Accordingly, the IF down-converter 223 down converts incoming IF signals in a TDM manner. The down converted results are stored in the buffer 229.

Figure 4A:
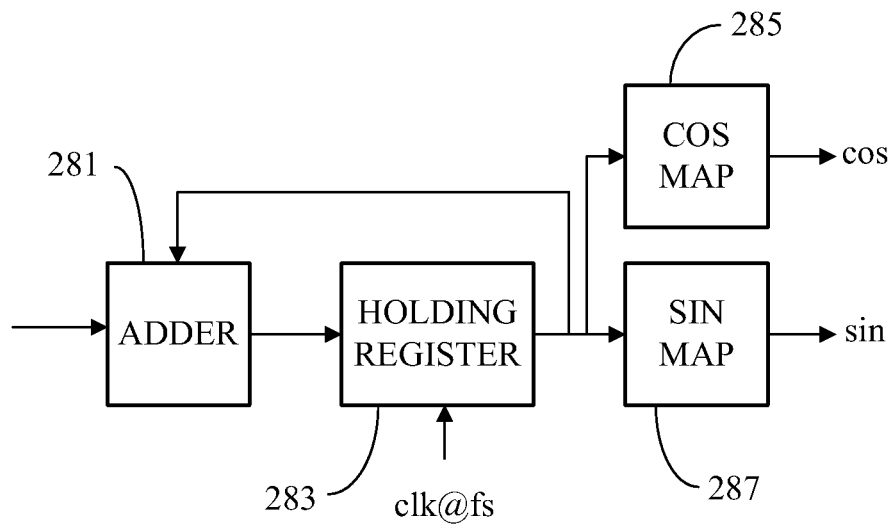
FIG. 4A shows a general numeral controller oscillator (NCO)
Figure 4B:
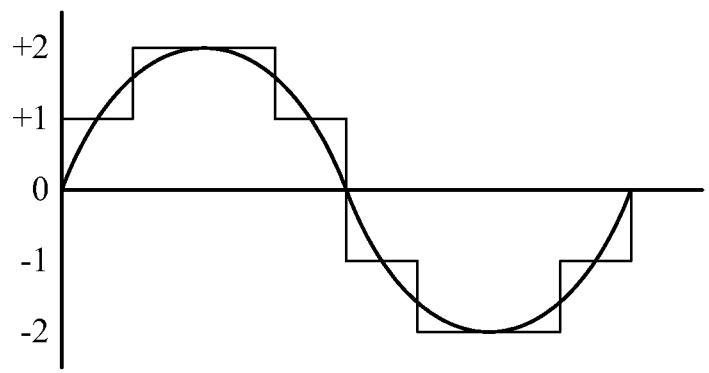
FIG. 4B shows a simulated waveform and a mapping true table of the NCO.

FIG. 4A shows a basic structure of a general NCO 28. FIG. 4B shows a simulated waveform and a mapping true table of the NCO 28. Each of the local oscillators mentioned in the embodiments of the present invention can be implemented by such an NCO. Any other suitable oscillators are also usable. The NCO 28 has an adder 281, a holding register 283, a COS map unit 285 and a SIN map unit 287. A clock clk@fs is fed to the holding register 283 to determine the frequency of the NCO 28. The adder 281 executes phase accumulation according to the clock rate. The accumulated result (i.e. NCO phase) is fed back for the next accumulation. The accumulated output is passed to the COS map unit 285 or SIN map unit 287 to execute look-up table (LUT) operation so as to output a simulated cosine or sine wave. By controlling the accumulating step of the adder 281, the output frequency can be adjusted. FIG. 4B shows a simple example of the simulated waveform and the true table used in the LUT operation.

Figure 5:
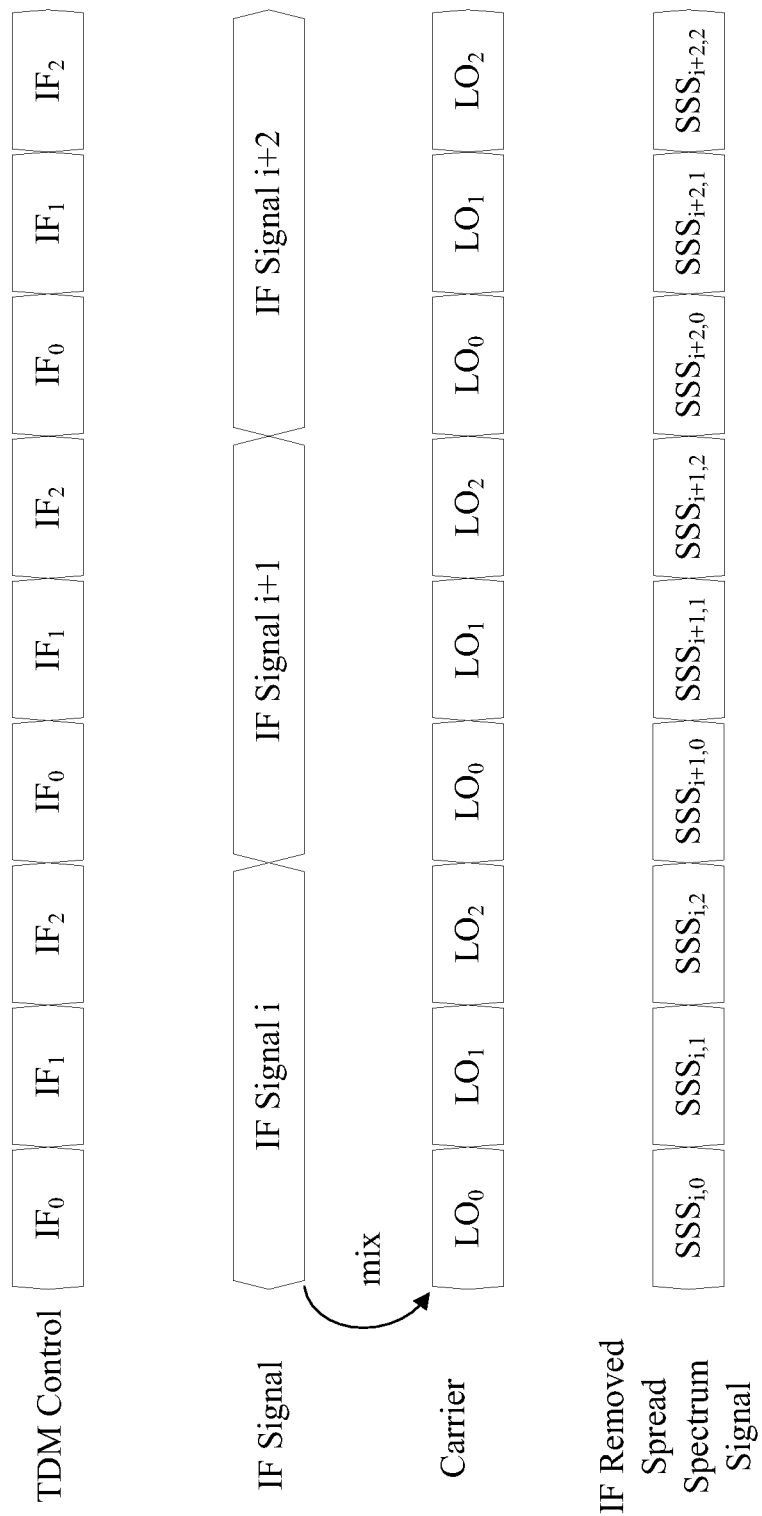
FIG. 5 shows an example of time division multiplexing scheme executed by IF process engine of FIG. 3.

In the present embodiment, the IF process engine 220 has three local oscillators 228, for example. The TDM scheduling scheme is as shown in FIG. 5. The upper most row indicates time slot schedule of the multiplexer 224 arranged by the TDM controller 225. The second row indicates the incoming IF signals. The third row indicates carriers $LO_0$, $LO_1$, $LO_2$ generated by the local oscillators 228, respectively. The lowest row shows the IF removed spread spectrum signal stored in the buffer 229. As shown, the time slots are assigned as $IF_0$, $IF_1$, $IF_2$. For time t=i, in the time slot $IF_0$, the carrier $LO_0$ is mixed with the IF signal i to generate a segment of IF removed spread spectrum signal $SSS_{i,0}$; in the time slot $IF_1$, the carrier $LO_1$ is mixed with the IF signal i to generate a segment of IF removed spread spectrum signal $SSS_{i,1}$; in the time slot $IF_2$, the carrier $LO_2$ is mixed with the IF signal i to generate a segment of IF removed spread spectrum signal $SSS_{i,2}$. For time=i+1, i+2 . . . , the scheduling manner is the same.

In this case, the operation rate of each block of the IF process engine 220 is triple of the IF signal. That is, the operation rate of the IF process engine 220 is triple of a sampling rate of the RF front end 212, also with reference to FIG. 2. In one sample period, three sample values of each sinusoidal waveform with different frequencies are mixed with the incoming data samples of the IF signal. After mixing, the IF removed spread spectrum signal is stored in the buffer 229 and then sent to the subsequent blocks such as the correlator engine 230 and the processor 250.

Figure 6:
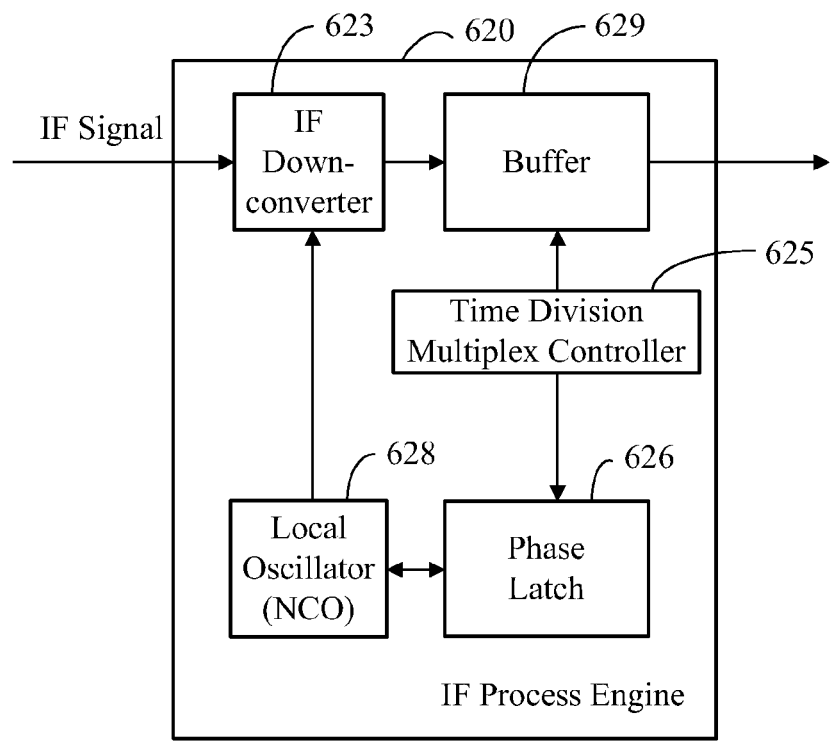
FIG. 6 is a block diagram schematically showing an IF process engine in accordance with a second embodiment of the present invention.

FIG. 6 is a block diagram schematically showing an IF process engine 620 in accordance with a second embodiment of the present invention. The IF process engine 620 of the present embodiment includes an IF down-converter 623, a time division multiplex (TDM) controller 625, a phase latch 626, a local oscillator 628 and a buffer 629. As can be seen from the drawing, the local oscillator part of this IF process engine 620 includes only a single local oscillator 628. The local oscillator 628 is implemented by an NCO. Since the status of the NCO can be easily restored by latching the accumulated result (i.e. NCO phase), the plurality of NCOs used in the first embodiment can be replaced by a single NCO and an NCO phase latch in this embodiment. The phase latch 626, which is controlled by the TDM controller 625, latches the NCO phase for each carrier, so that single local oscillator 628 can generate a plurality of carriers with different frequencies in a TDM manner.

Figure 7:
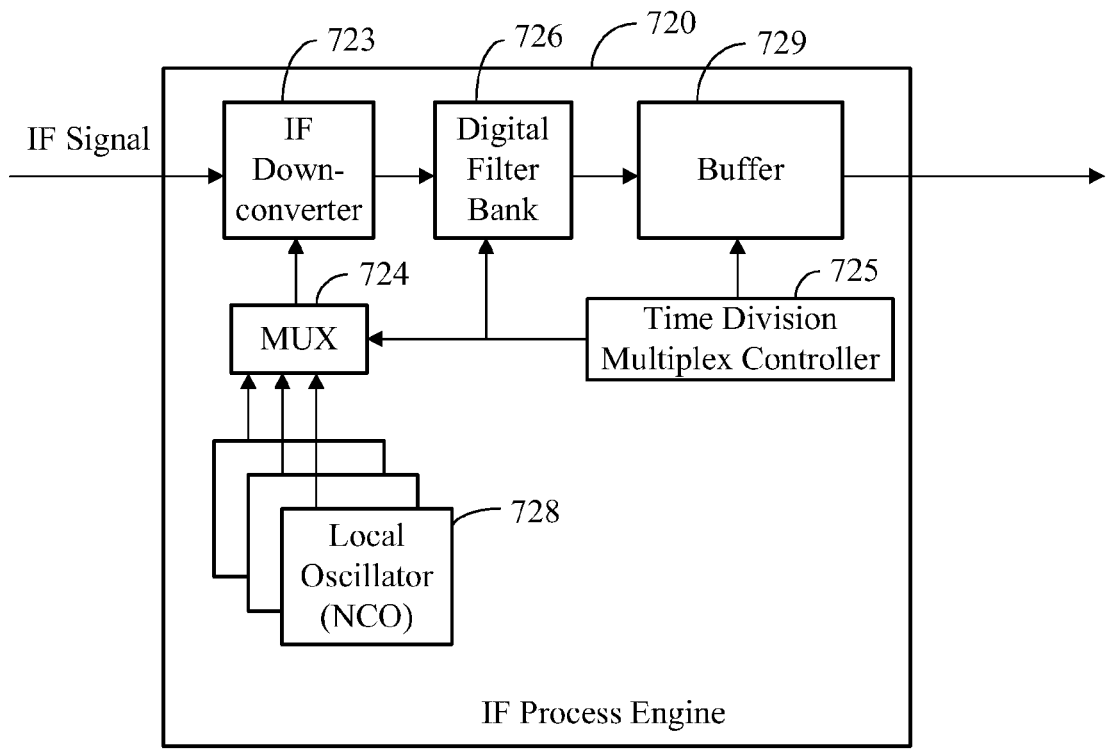
FIG. 7 is a block diagram schematically showing an IF process engine in accordance with a third embodiment of the present invention.

FIG. 7 is a block diagram schematically showing an IF process engine 720 in accordance with a third embodiment of the present invention. The IF process engine 720 is similar to the IF process engine 220 shown in FIG. 3, and the like reference numbers indicate the same components, of which the descriptions are omitted herein to avoid redundancy. The difference there between is that the IF process engine 720 further has a digital filter bank 726 including a plurality of filters therein. The digital filters (not shown) of the digital filter bank 726 are used to respectively filter out noises of the baseband signals (i.e. IF removed spread spectrum signals) down converted from different IF signals by the IF down-converter 723 so as to promote signal performance.

Figure 8:
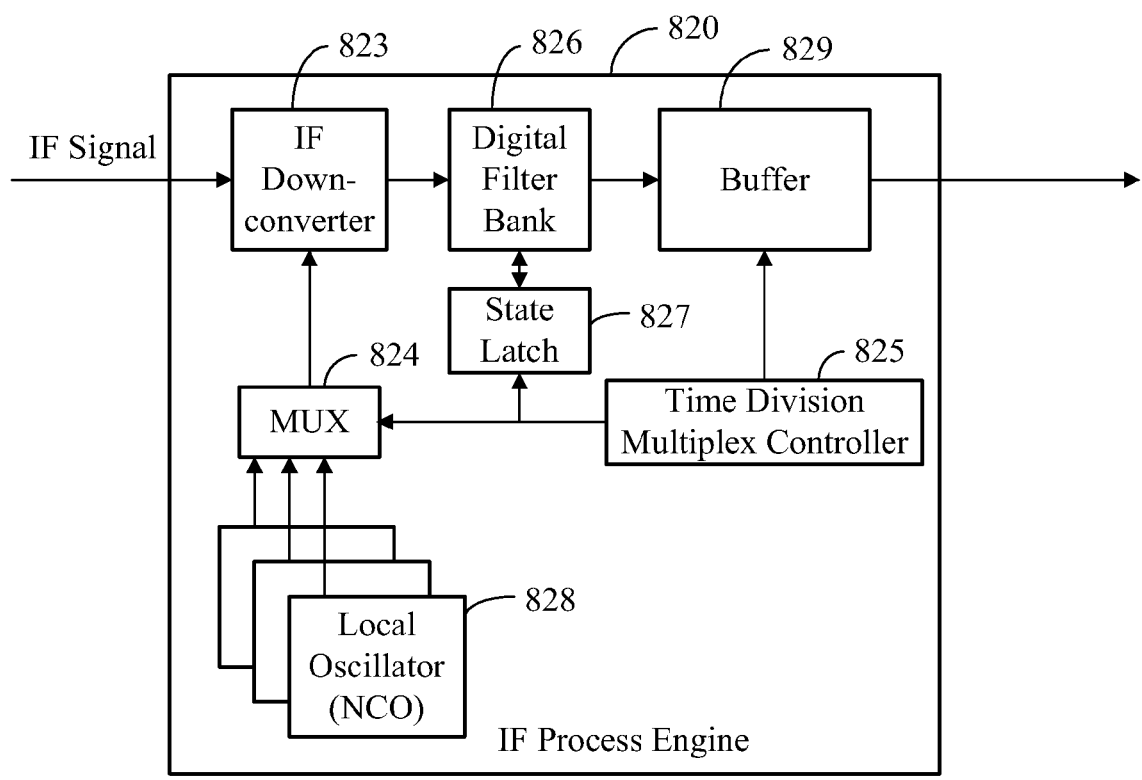
FIG. 8 is a block diagram schematically showing an IF process engine in accordance with a fourth embodiment of the present invention.

Since the different IF signals with different carrier frequencies are down converted to the same base band, it is possible to use a single digital filter only. FIG. 8 is a block diagram schematically showing an IF process engine 820 in accordance with a fourth embodiment of the present invention. The IF process engine 820 is similar to the IF process engine 720 shown in FIG. 7. The only difference is that the IF process engine 820 uses a single digital filter 826 to filter out the noises of each IF removed spread spectrum signal processed by the IF down-converter 823. In this case, filter function relates to past states, so it is necessary to latch the filter state for each IF removed spread spectrum signal. Therefore, a state latch 827 is used to latch the filter state for the respective IF removed spread spectrum signals.

Although the structures of the IF process engines of FIG. 7 and FIG. 8 are similar to that of FIG. 3, the digital filter part (e.g. the digital filter bank having a plurality of digital filters or the digital filter with the state latch) can be added to the IF process engine structure shown in FIG. 6.

Figure 9:
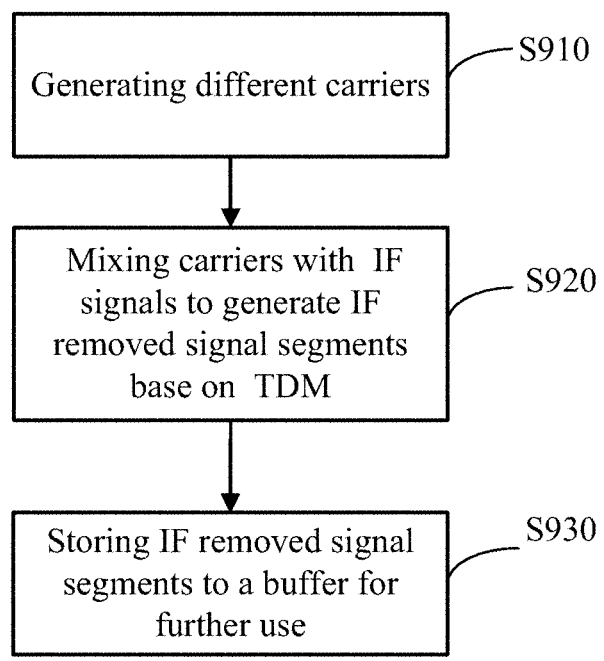
FIG. 9 is a flow chart showing main steps of a method for removing IF carriers with different frequencies from IF signals in a GNSS receiver in accordance with the present invention.

The method for removing IF carriers with different frequencies from plural IF signals in the GNSS receiver can be generalized into a flow chart of FIG. 9. As shown, the method includes steps of generating a plurality of different carriers (i.e. carriers with different frequencies) (step S910); mixing the respective carriers with the respective IF signals to generate IF removed signal segments base on a TDM schedule (step S920); and storing the IF removed signal segments to a buffer, for example (step S930). As described, the IF removed spread spectrum signals are stored in the buffer so as to be sent to the subsequent blocks such as a correlator engine and a processor for further use.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. An intermediate frequency (IF) process engine for a GNSS receiver, comprising:
   a local oscillator part for generating a plurality of carriers with different frequencies;
   an IF down-converter for respectively mixing IF signals with the carriers generated by the local oscillator part to generate IF removed signal segments;
   a time division multiplex (TDM) controller for scheduling the respective mixing operations of the IF down-converter; and
   a buffer for storing the IF removed signal segments generated by the IF down-converter.

2. The IF process engine of claim 1, further comprising a multiplexer for passing one of the carriers a time under the control of the TDM controller.

3. The IF process engine of claim 2, wherein the local oscillator part comprises a plurality of local oscillators, each local oscillator generates one of the carriers.

4. The IF process engine of claim 3, wherein each of the local oscillators is implemented by a numerical controlled oscillator (NCO).

5. The IF process engine of claim 1, wherein the local oscillator part comprises a single local oscillator.

6. The IF process engine of claim 5, wherein the local oscillator is implemented by an NCO, the NCO generates the carriers with different frequencies by accumulating NCO phases with different steps.

7. The IF process engine of claim 6, further comprising a phase latch for latching the accumulated NCO phases.

8. The IF process engine of claim 1, further comprising a digital filter part for filter out noises of the IF removed signal segments generated by the IF down-converter.

9. The IF process engine of claim 8, wherein the digital filter part is implemented by a digital filter bank having a plurality of digital filters, each of which is used for only allowing the IF removed signal segments down converted by mixing one carrier with the IF signal to pass to the buffer to be stored.

10. The IF process engine of claim 8, wherein the digital filter part comprises a single digital filter, and the IF process engine further comprises a state latch for latching states of the digital filter so that the digital filter allows the IF removed signal segments down converted by mixing the respective carrier with the IF signal to pass to the buffer to be stored.

11. A GNSS receiver comprising:
    an RF front end for down converting the RF signals into intermediate frequency (IF) signals;
    an IF process engine for providing a plurality of carriers with different frequencies and down converting the IF signals into baseband signals by using the carriers in a time division multiplex (TDM) schedule; and
    a correlator engine for correlating the baseband signals with codes to generate correlation results.

12. The GNSS receiver of claim 11, wherein the IF process engine comprises:
    a local oscillator part for generating a plurality of carriers with different frequencies;
    an IF down-converter for respectively mixing the IF signals with the carriers generated by the local oscillator part to generate IF removed signal segments;
    a time division multiplex (TDM) controller for scheduling the respective mixing operations of the IF down-converter; and
    a buffer for storing the IF removed signal segments generated by the IF down-converter.

13. The GNSS receiver of claim 12, wherein the IF process engine further comprises a multiplexer for passing one of the carriers a time under the control of the TDM controller.

14. The GNSS receiver of claim 13, wherein the local oscillator part comprises a plurality of local oscillators, each local oscillator generates one of the carriers.

15. The GNSS receiver of claim 14, wherein each of the local oscillators is implemented by a numerical controlled oscillator (NCO).

16. The GNSS receiver of claim 12, wherein the local oscillator part comprises a single local oscillator.

17. The GNSS receiver of claim 16, wherein the local oscillator is implemented by an NCO, the NCO generates the carriers with different frequencies by accumulating NCO phases with different steps.

18. The GNSS receiver of claim 17, further comprising a phase latch for latching the accumulated NCO phases.

19. The GNSS receiver of claim 12, wherein the GNSS receiver further comprises a digital filter part for filter out noises of the IF removed signal segments generated by the IF down-converter.

20. The GNSS receiver of claim 19, wherein the digital filter part is implemented by a digital filter bank having a plurality of digital filter, each of which is used for only allowing the IF removed signal segments down converted by mixing one carrier with the IF signal to pass to the buffer to be stored.

21. The GNSS receiver of claim 19, wherein the digital filter part comprises a single digital filter, and the IF process engine further comprises a state latch for latching states of the digital filter so that the digital filter allows the IF removed signal segments down converted by mixing the respective carrier with the IF signal to pass to the buffer to be stored.

22. The GNSS receiver of claim 11, wherein the IF process engine operates with a particular sampling rate which is the plurality of times of that of the RF front end.

23. A method for removing intermediate frequency (IF) carriers with different frequencies from IF signals in a GNSS receiver, the method comprising steps of:
    generating a plurality of carriers with different frequencies;
    mixing the respective carriers with IF signals to generate IF removed signal segments on a TDM schedule; and
    storing the IF removed signal segments.

* * * * *